J. J. HOWD.
ATTACHABLE MANURE SPREADER.
APPLICATION FILED NOV. 4, 1909.
963,896.
Patented July 12, 1910.
2 SHEETS—SHEET 1.
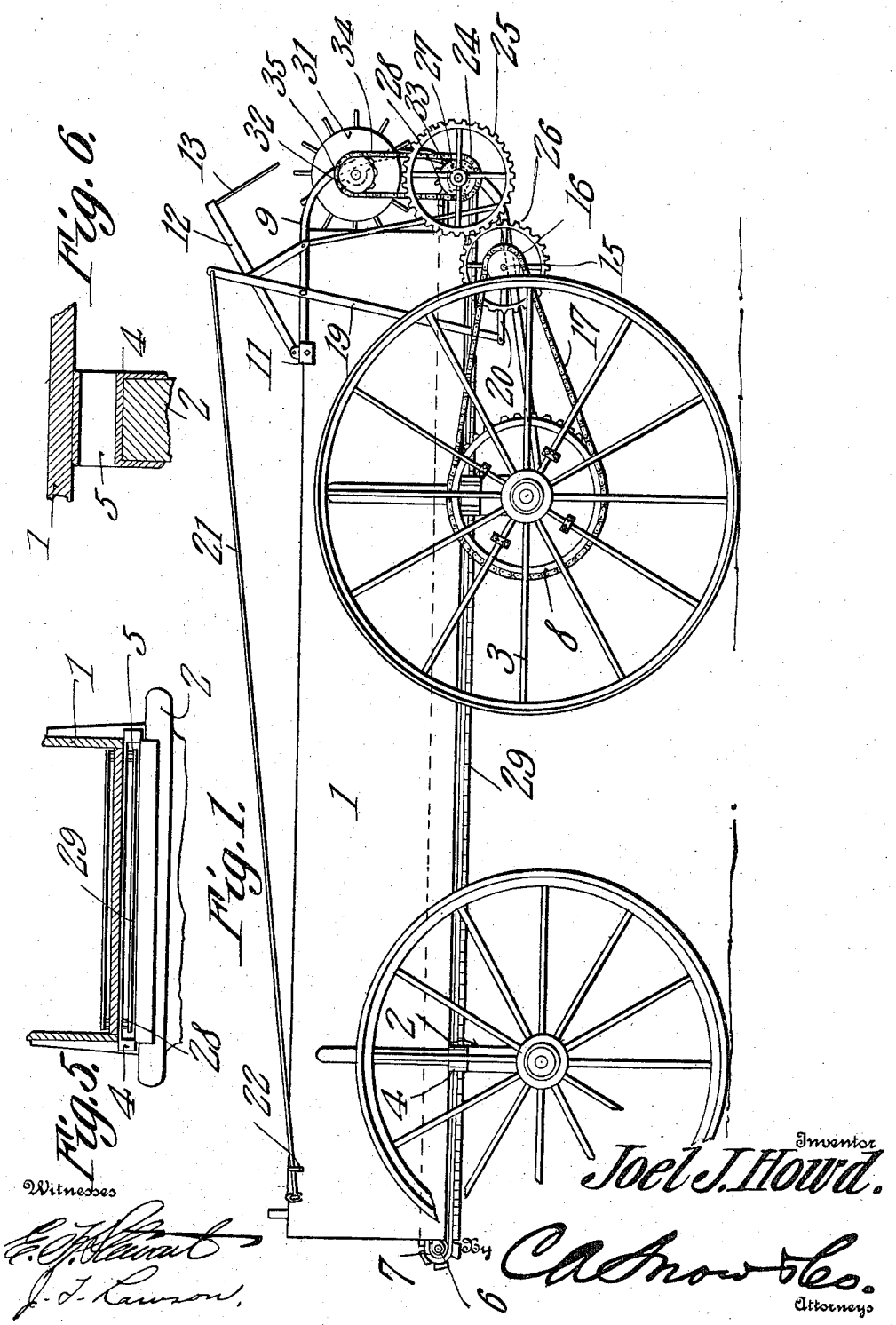
Inventor
Joel J. Howd.

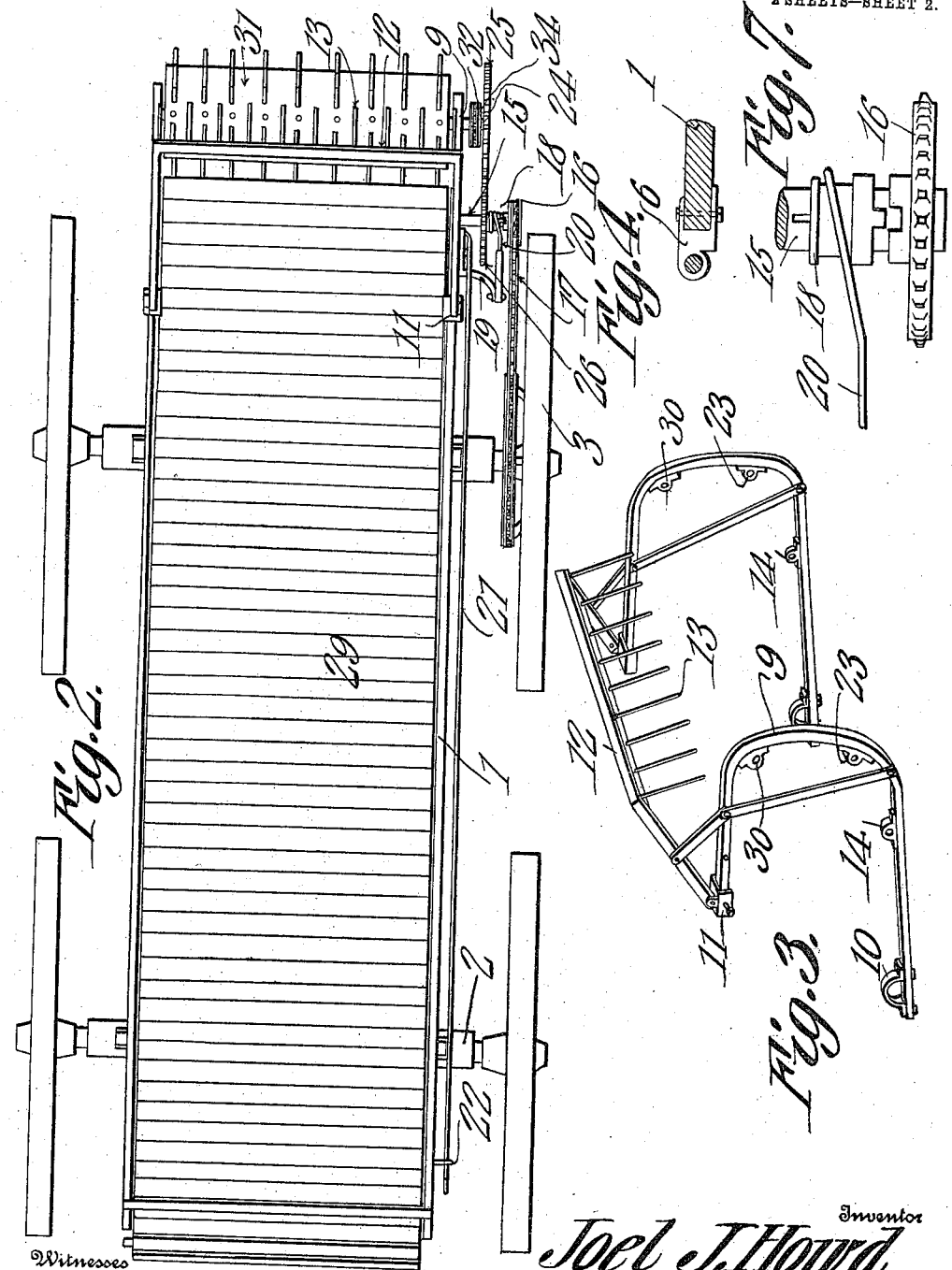

UNITED STATES PATENT OFFICE.

JOEL J. HOWD, OF BURNSIDE, ILLINOIS.

ATTACHABLE MANURE-SPREADER.

963,896.      Specification of Letters Patent.      Patented July 12, 1910.

Application filed November 4, 1909. Serial No. 526,237.

*To all whom it may concern:*

Be it known that I, JOEL J. HOWD, a citizen of the United States, residing at Burnside, in the county of Hancock and State of Illinois, have invented a new and useful Attachable Manure-Spreader, of which the following is a specification.

This invention has relation to attachable manure spreaders and it consists in the novel construction and arrangement of its parts as hereinafter shown and described.

The object of the invention is to provide a simple and durable structure in the form of an attachment adapted to be applied to the body and running gear of an ordinary farm wagon and to be used for the purpose of spreading manure carried beneath the body.

With the above object in view the attachment includes a frame having side brackets adapted to be applied to the sides of the wagon body and the end portions of the hind axle of the running gear and which are provided with U clamps adapted to receive the said axle. The brackets are further provided with bearings adapted to receive transversely disposed shafts upon which are mounted gear wheels and sprocket wheels, the sprocket wheels operatively connected with one of the rear wheels of the wagon running gear. The said shafts are adapted to actuate an apron which moves longitudinally of the wagon body and also a spreader cylinder located at the upper portion of the frame of which the brackets form component parts.

In the accompanying drawings: Figure 1 is a side elevation of the body and running gear of a wagon with the manure spreader attached thereto. Fig. 2 is a top plan view of the same. Fig. 3 is a detail perspective view of the frame portion of the manure spreader. Fig. 4 is a side elevation of a detachable bearing adapted to be applied to the forward end of the bottom of the wagon body. Fig. 5 is a transverse sectional view of the wagon body showing a supplemental bolster in position upon the terminus bolster of the running gear. Fig. 6 is a transverse sectional view of the supplemental bolster located upon the terminus bolster of the running gear.

As illustrated in the accompanying drawings, 1 indicates the body of an ordinary farm wagon mounted upon bolsters 2 of a running gear of which the rear wheels 3 form component parts. Supplemental bolsters 4 are positioned above the permanent bolsters 2 and are provided with slots 5 through which the lower run of an apron (hereinafter to be described) passes. Bearing blocks 6 are detachably mounted at the forward end of the bottom of the wagon body 1 and a roller 7 is journaled in the said bearing. A sprocket rim 8 is attached to the spokes of one of the rear wheels 3.

The frame which forms the major portion of the spreader attachment consists of side brackets 9 which are provided at their lower ends with U-shaped clamps 10 adapted to receive the rear axle of the running gear of the wagon. The said brackets 9 are substantially U-shaped in side elevation and their end portions receive between them the rear end portions of the sides of the wagon body 1. The brackets 9 are provided at their upper ends with clamps 11 adapted to receive the upper edge portions of the sides of the wagon body 1. A rake bar 12 is connected with the upper end of the bracket 9 and extends transversely across the rear portion of the wagon body 1 and is provided with teeth 13 of usual arrangement. Bearings 14 are mounted upon the lower portions of the brackets 9 and a shaft 15 is journaled in the said bearings. A sprocket wheel 16 is mounted upon the shaft 15 and a sprocket chain 17 passes around the sprocket rim 8 and the sprocket wheel 16. The sprocket wheel 16 is loosely mounted upon the shaft 15 and is provided with a clutch hub of usual pattern. A clutch member 18 is slidably mounted upon the said shaft 15 but is restrained against independent rotary movement with relation to the shaft. A lever 19 is fulcrumed to the upper portion of one of the brackets 9 and the forward end of an arm 20 is pivotally connected with the lower end of the said lever 19. The rear end of the said arm 20 engages with the clutch member 18 and is adapted to shift the said member longitudinally of the shaft 15 when the said arm is moved longitudinally as the lever 19 is swung. A rod 21 is pivotally connected at its rear end with the upper end of the lever 19 and the forward end of the said rod 21 lies in a guide 22 provided at the side of the wagon body 1. Bearings 23 are also mounted upon the brackets 19 and a shaft 24 is journaled for rotation in the said bearings. A gear wheel 25 is fixed to the shaft 24 and meshes with a gear wheel 26 fixed to the shaft 15. Sprocket wheels 27 are fixed to the shaft 24 and sprocket chains 28 of an endless apron 29 pass around the said sprocket wheel 27. The apron 29 and the said chains also pass around the roller 7 at the forward end of the body 1. Bearings 30 are mounted upon the upper portions of the brackets 9 and the shaft of a distributing cylinder 31 is journaled in the said bearings 30. A sprocket wheel 32 is fixed to the shaft of the cylinder 31 and a sprocket wheel 33 is fixed to the shaft 24. A sprocket chain 34 passes around the sprocket wheels 32 and 33.

The operation of the attachment is as follows: Presuming that the body 1 contains a load of manure and the running gear is moving over the surface of the ground. When it is desired to spread the contents of the said body 1 upon the surface of the ground, the operator moves the rod 31 longitudinally which in turn swings the lever 19 upon its fulcrum which in turn moves the arm 20 longitudinally and throws the clutch member 18 into gear with the hub of the wheel 16. Thus rotary movement is transmitted from the traction wheels 3 through the rims 8 and sprocket chain 17 and sprocket wheel 16 to the shaft 15. Through the intermeshing gear wheels 26 and 25 rotary movement is transmitted from the shaft 15 to the shaft 24. As the said shaft 24 rotates, the apron 29 is moved in an orbit, its lower run passing through the openings 5 provided in the supplemental bolsters 4. The upper run of the said apron 29 moves toward the brackets 9 and consequently the material in the body 1 is carried toward the said brackets upon the upper run of the said apron. At the same time rotary movement is transmitted through the sprocket wheels 33 and 32 and chain 34 to the distributing cylinder 31 and the fingers 35 upon the periphery of the said cylinder engage the material and carry the same up and under the teeth 13 upon the rake bar 12. Thus the material is elevated and thrown rearwardly as the wagon running gear moves over the ground.

Having described the invention, what I claim as new and desire to secure by Letters Patent is:—

1. An attachable manure spreader comprising a frame having U shaped side brackets, clamps mounted upon the lower portions of the brackets and adapted to receive the axle of a running gear, clamps mounted upon the upper portions of the brackets and adapted to receive the sides of a wagon body, an apron shaft journaled for rotation upon the brackets and having connecting means for operating the same from the wheel of a wagon running gear and a distributing cylinder journaled between the brackets and operatively connected with the apron shaft.

2. In combination with a wagon body mounted upon a running gear, an attachable manure spreader comprising a frame having clamps for attachment with the axle of the running gear and the side board of the wagon body, a shaft journaled upon the frame, means for transmitting rotary movement from one of the wheels of the running gear to said shaft, said means including a clutch member, a clutch member mounted upon the said shaft, a lever fulcrumed to the frame and having an arm operatively connected with the clutch member upon the shaft, an apron shaft journaled upon the frame and operatively connected with the first said shaft, a cylinder journaled upon the frame and operatively connected with the apron shaft, supplemental bolsters having elongated openings adapted to be applied to the terminus bolsters of the running gear, an endless apron having its lower run passed through the openings in the supplemental bolsters, bearing blocks mounted at the forward portion of the wagon body, a roller journaled for rotation in the bearing blocks, said apron passing around the said roller and around the apron shaft.

In testimony that I claim the foregoing as my own, I have hereto affixed my signature in the presence of two witnesses.

JOEL J. HOWD.

Witnesses:
J. F. AKIN,
S. D. STONER.